United States Patent Office 3,394,110
Patented July 23, 1968

3,394,110
PRODUCTION OF POLYESTERS BY POLY-CONDENSATION IN PRESENCE OF TELLURIUM COMPOUND AS POLYCONDENSATION CATALYST
Takao Toda, Kyoto, and Kentaro Yoda and Kazuyuki Kimoto, Shiga-ken, Japan, assignors to Toyo Boseki Kabushiki Kaisha, Osaka, Japan
No Drawing. Filed Dec. 10, 1965, Ser. No. 513,067
Claims priority, application Japan, Dec. 16, 1964, 39/71,187
4 Claims. (Cl. 260—75)

ABSTRACT OF THE DISCLOSURE

In improvement in the polycondensation of a bisglycol ester of a dicarboxylic acid or a precondensate of such ester, according to which the polycondensation is carried out in the presence of a catalytic amount of a tellurium compound as polycondensation catalyst, to yield polyesters in polymer form, the coloration of which can be controlled by varying the amount of tellurium compound catalyst. The obtained polymeric polyesters are useful as fibers, films, adhesives, etc.

---

This invention relates to improvements in the production of polyesters of high molecular weight, particularly polyesters composed principally of aromatic dicarboxylic acid(s). More particularly this invention relates to the use of a tellurium compound as a catalyst for the production of polyesters.

In the production of polyesters, it has been conventional to prepare a bisglycol ester of a dicarboxylic acid or a precondensate thereof by subjecting a lower alkyl ester of the dicarboxylic acid to an ester exchange reaction with a glycol or by reacting the carboxylic acid directly with a glycol or alkylene oxide. Subsequently the bisglycol ester or its precondensate is subjected to polycondensation at an elevated temperature and under reduced pressure.

While various catalysts have been employed in order to cause these reactions to proceed smoothly and to obtain the desired polyester economically, many of the hitherto-known catalysts have drawbacks of causing discoloration or other deterioration of the polymer during the polycondensation which is conducted at a high temperature for a prolonged period of time.

We have found that, when a tellurium compound is used as the polycondensation catalyst, there are obtained high molecular weight and high grade polyesters useful as fibers, films, adhesives, etc. One of the important advantages of this invention is that the shade of the resulting polymer can be suitably controlled by varying the amount of the tellurium compound. Thus, the polycondensation catalysts of this invention are reduced in the course of the polycondensation reaction and the resulting reduction products tend to impart a blue tint to the final polymer.

As for tellurium compounds, such inorganic salts as tellurium chloride, sulfate, nitrate, borate, etc.; such organic salts as tellurium stearate, benzoate, adipate, etc.; telluric acid, tellurous acid or their salts; tellurium oxide; such organic metal compounds as tellurium alcoholates, diphenyl telluride, etc., may be used. Among these tellurium compounds, tellurium dichloride, tellurium tetrachloride, telluric acid, sodium tellurate, tellurous acid, potassium tellurite, tellurium dioxide, tellurium trioxide, tellurium glycolate, tellurium ethylate, etc., are preferred.

According to the invention at least one of these tellurium compounds is used as a polycondensation catalyst in the polycondensation of a bisglycol ester of a dicarboxylic acid or a precondensate of such bisglycol ester. The amount of the tellurium compound(s) to be used may vary over a wide range depending upon the particular reaction condition and the shade desired in the polymer. Generally, a satisfactory result is obtained if the catalyst is used in an amount of 0.0001 to 0.05% by weight based on the acid component of the polyester to be produced.

The catalyst of this invention may be added to the reaction system at any time before the polycondensation reaction starts. Thus the catalyst of this invention may be added along with an ester-exchange catalyst or esterification catalyst in the preceding stage for the preparation of bisglycol ester of dicarboxylic acid or precondensate of the bisglycol ester. The catalyst (polycondensation catalyst), of this invention may also be employed together with a known polycondensation catalyst.

Thus, the catalyst of this invention may be used together with another catalyst selected from the group consisting of those compounds containing an alkaline earth metal, magnesium, zinc, cadmium, lead, manganese, cobalt, germanium, antimony, titanium, etc.

Except for the use of the novel polycondensation catalyst (tellurium compound), the preparation of bisglycol ester of dicarboxylic acid or precondensate (prepolymer) of the bisglycol ester and the subsequent polycondensation may be conducted in a conventional or well known manner. Since these techniques are very well known in the art, no detailed explanation thereabout will be necessary. Thus, for example, the polycondensation reaction may be conducted at a temperature of about 200–300° C. under a reduced pressure of 0.2 mm. Hg or lower. Usually the reaction is conducted for 0.5–5 hours.

As for dicarboxylic acids, terephthalic acid, isophthalic acid, cyclohexanedicarboxylic acid, naphthalene dicarboxylic acid, adipic acid, sebacic acid, etc., may be exemplified. Oxy acids such as oxybenzoic acid, oxypivalic acid, etc., may also be used. A mixture of two or more of these acids may be used.

As for glycols, ethylene glycol, butane diol, neopentylglycol, cyclohexane dimethanol, etc., may be exemplified. A mixture of two or more of these glycols may be used.

It is, of course, possible to add other suitable materials such as modifiers, stabilizers, colorants, titanium oxide, pigments, etc., which are known per se as additives for polyesters.

The present invention will be further described by way of the following examples wherein all parts are by weight and the intrinsic viscosity [Y] has been determined in phenol-tetrachloroethane (6:4) at 30° C. by the following formula:

$$[Y] = \frac{3}{4}\frac{\ln Yr}{C} + \frac{1}{4}\frac{Ysp}{C}$$

in which $$Yr = \frac{\text{flow out time of solution}}{\text{flow out time of solvent}}$$

$Ysp = Yr - 1$

C: concentration (grams) of polyester sample per 100 ml. of the solvent.

EXAMPLE 1

To a mixture of 100 parts of dimethyl terephthalate and 80 parts of ethylene glycol was added 0.03 part of zinc acetate, and ester-exchange reaction was conducted at 190° C. for 1 hour. The ethanol formed in the course of the reaction was continuously removed from the reaction system. Then 0.002 part of tellurium dioxide was added, and as the temperature was elevated to 271° C. the system was gradually evacuated to distill off the excess ethylene glycol. Thus, the polycondensation reaction was conducted under a reduced pressure of 0.2 mm. Hg for 4 hours. The polymer obtained in this manner was colorless, transparent and had a melting point of 262° C. and an intrinsic viscosity of 0.61.

In a control experiment, when the same precondensate was polycondensed under the same conditions as above but without the addition of tellurium dioxide, the final polymer was yellow and had an intrinsic viscosity of 0.58.

EXAMPLE 2

To a mixture of 90 parts of dimethyl terephthalate, 10 parts of dimethyl isophthalate and 80 parts of ethylene glycol were added 0.03 part of sodium zincate and 0.003 part of telluric acid, and the ester-exchange reaction was conducted at 190° C. for 1 hour. The methanol formed was removed from the reaction system. Then, as the temperature was elevated to 255° C., the system was gradually evacuated to remove the excess ethylene glycol. Thereafter, the polycondensation reaction was carried out under 0.25 mm. Hg for 4 hours. The above procedure yielded a colorless transparent polyester copolymer having a melting point of 236° C. and an intrinsic viscosity of 0.60.

EXAMPLE 3

To 100 parts of bis-$\beta$-hydroxyethylterephthalate were added 0.02 part of zinc acetate and 0.005 part of tellurium glycolate, and the polycondensation reaction was conducted at 271° C. under 0.2 mm. Hg for 4 hours. A polyester of extremely light blue-gray having a melting point of 263° C. and an intrinsic viscosity of 0.60 was obtained.

EXAMPLE 4

To a mixture of 100 parts of dimethyl terephthalate and 80 parts of ethylene glycol was added 0.05 part of calcium acetate, and the ester-exchange reaction was conducted at 190° C. for 3 hours, while the methanol formed in the course of the reaction was removed from the reaction system. Then 0.003 part of tellurium tetrachloride was added, and as the temperature was elevated to 271° C., the system was gradually evacuated to distill the excess ethylene glycol. The polycondensation reaction was carried out under 0.3 mm. Hg for 5 hours, to obtain a polymer having a satisfactory shade. It had a melting point of 259° C. and an intrinsic viscosity of 0.59.

EXAMPLE 5

150 parts of terephthalic acid and 112 parts of ethyleneglycol were mixed with 75 parts of methanol (as solvent). The reaction system was covered by nitrogen gas and heated while stirring. When the internal pressure reached 2.2 kg./cm.$^2$ methanol began to be distilled out, and then the reaction system was maintained at 240° C. under constant pressure while removing methanol and formed water from the reaction system, for 130 minutes to complete the esterification. Then 0.03 part of manganese acetate and 0.01 part of tellurium dioxide were added to the esterification product, and the polycondensation reaction was conducted at 271° C. and under 0.1 mm. Hg for 3 hours. In this way, a polymer of a satisfactory shade having a melting point of 264° C. and an intrinsic viscosity of 0.65 was obtained.

EXAMPLE 6

To 100 parts of bis-$\beta$-hydroxyethyl-terephthalate was added 0.05 part of sodium tellurate, and the polycondensation reaction was conducted for 5 hours at 271° C. and under 0.1 mm. Hg while stirring. There was obtained a polymer of a satisfactory shade having a melting point of 266° C. and an intrinsic viscosity of 0.58.

The same procedure was repeated except the addition of the sodium tellurate. The polymer obtained was light yellow in color, and had a melting point of 263° C. and an intrinsic viscosity of 0.47.

EXAMPLE 7

A mixture of 50 parts of bis-$\beta$-hydroxyethylterephthalate and 32 parts of terephthalic acid was stirred at 250° C. for 2 hours to obtain a homogeneous system. Then 0.03 part of zinc acetate and 0.008 part of tellurium dioxide were added, and the polycondensation reaction was conducted at 271° C. and under 0.1 mm. Hg for 4 hours.

The polymer obtained was satisfactory in shade, and had a melting point of 266° C. and an intrinsic viscosity of 0.68.

We claim:
1. In a method for the production of a polyester in polymer form by polycondensing a bisglycol ester of a dicarboxylic acid or a precondensate of the ester in the presence of a catalyst, the improvement which comprises carrying out the polycondensation in the presence of a tellurium compound as polycondensation catalyst, said tellurium compound being selected from the group consisting of inorganic acid salts of tellurium, organic acid salts of tellurium, telluric acid and its salts, tellurous acid and its salts, tellurium oxide, alcoholates of tellurium and organic metal compounds of tellurium.

2. The improvement as claimed in claim 1 wherein the acid component of said ester is terephthalic acid and/or isophthalic acid and the glycol component is selected from the group consisting of ethylene-glycol, butanediol, neopentylglycol and cyclohexane dimethanol.

3. In a method for the production of a polyester in polymer form by polycondensing a bisglycol ester of a dicarboxylic acid or a precondensate of the ester in the presence of a catalyst, the improvement which comprises carrying out the polycondensation in the presence of a tellurium compound as polycondensation catalyst, said tellurium compound being selected from the group consisting of tellurium dioxide, telluric acid. tellurium glycolate, tellurium tetrachloride and alkali metal salts of telluric acid.

4. In a method for the production of a polyester in polymer form by polycondensing a bisglycol ester of a dicarboxylic acid or a precondensate of the ester in the presence of a catalyst, the improvement which comprises carrying out the polycondensation in the presence of a tellurium compound as polycondensation catalyst, said tellurium compound being selected from the group consisting of tellurium dioxide, telluric acid, tellurium glycolate, tellurium tetrachloride and alkali metal salts of telluric acid, said tellurium compound being present in an amount of 0.001–0.05% by weight based on the acid component of said ester.

References Cited

UNITED STATES PATENTS 3,245,959   4/1966   Roeser _____ 260—75

WILLIAM H. SHORT, *Primary Examiner.*

L. P. QUAST, *Assistant Examiner.*